United States Patent
Kamigori

(10) Patent No.: US 10,513,151 B2
(45) Date of Patent: Dec. 24, 2019

(54) PNEUMATIC TIRE

(71) Applicant: Sumitomo Rubber Industries, Ltd., Kobe-shi, Hyogo (JP)

(72) Inventor: Atsushi Kamigori, Kobe (JP)

(73) Assignee: SUMITOMO RUBBER INDUSTRIES, LTD., Kobe-shi, Hyogo (JP)

( * ) Notice: Subject to any disclaimer, the term of this patent is extended or adjusted under 35 U.S.C. 154(b) by 607 days.

(21) Appl. No.: 14/668,433

(22) Filed: Mar. 25, 2015

(65) Prior Publication Data

US 2015/0273948 A1    Oct. 1, 2015

(30) Foreign Application Priority Data

Mar. 26, 2014   (JP) ................. 2014-064405

(51) Int. Cl.
   | | |
   |---|---|
   | *B60C 11/01* | (2006.01) |
   | *B60C 11/03* | (2006.01) |
   | *B60C 11/12* | (2006.01) |
   | *B60C 11/13* | (2006.01) |
   | *B60C 5/00* | (2006.01) |

(52) U.S. Cl.
   CPC ............... *B60C 11/01* (2013.01); *B60C 5/00* (2013.01); *B60C 11/0304* (2013.01); *B60C 11/1263* (2013.01); *B60C 11/13* (2013.01)

(58) Field of Classification Search
   CPC . B60C 11/01; B60C 11/0304; B60C 11/1263; B60C 11/04; B60C 11/13; B60C 2011/0337; B60C 2011/0339; B60C 2011/0381; B60C 2011/0374; B60C 2011/0369
   USPC ........................................ 152/209.8, 209.25
   See application file for complete search history.

(56) References Cited

U.S. PATENT DOCUMENTS

| | | | |
|---|---|---|---|
| 7,975,738 B2 * | 7/2011 | Ohki | ............... B60C 11/0316 152/209.22 |
| 2013/0153103 A1 | 6/2013 | Aoki | |

FOREIGN PATENT DOCUMENTS

| | | |
|---|---|---|
| EP | 2 085 252 A1 | 8/2009 |
| JP | 2000-168313 A | 6/2000 |
| WO | WO 2012/026546 A1 | 3/2012 |

OTHER PUBLICATIONS

Extended European Search Report dated Oct. 28, 2015, in European Patent Application No. 15156441.6.

* cited by examiner

*Primary Examiner* — Seyed Masoud Malekzadeh
(74) *Attorney, Agent, or Firm* — Birch, Stewart, Kolasch & Birch, LLP

(57) ABSTRACT

A pneumatic tire comprises a tread portion provided with a shoulder main groove and shoulder blind grooves. The shoulder blind grooves extend axially inwardly from one of the tread edges and each having an axially inner blind end. The shoulder main groove extends circumferentially of the tire on the axially inside of the axially inner blind ends of the shoulder blind grooves. Each shoulder blind groove is provided with an axially inner shallow part, an axially outer deep part, and a sloped part therebetween having a depth gradually increasing from the shallow part towards the deep part, and having an axially outer end positioned at a distance from the tire equator which is 42.5% to 45% of the tread width.

23 Claims, 5 Drawing Sheets

PNEUMATIC TIRE

BACKGROUND OF THE INVENTION

The present invention relates to a pneumatic tire, more particularly to a tread pattern capable of improving the cornering performance in dry road surface conditions and the drainage performance in wet road surface conditions.

A pneumatic tire provided in the tread portion with an axially outermost shoulder main groove extending continuously in the tire circumferential direction, and shoulder blind grooves extending axially inwardly from the tread edge adjacent to the shoulder main groove and terminating without reaching to the shoulder main groove, has been disposed, for example, in PCT International Publication No. WO2012/026546.

In the pneumatic tire disclosed in this PCT International Publication, the shoulder blind groove is provided near an edge of a tread reinforcing belt with a part in which the groove bottom rises. Such part has a possibility of deteriorating the drainage of the shoulder blind groove. Further, near the axially inner end of the shoulder blind groove, the shoulder blind groove is deep, therefore, the rigidity of the tread portion is liable to become insufficient during cornering, and there is a possibility that the cornering performance in dry road surface conditions is deteriorated.

SUMMARY OF THE INVENTION

It is therefore, an object of the present invention to provide a pneumatic tire in which the cornering performance in dry road surface conditions and the drainage performance in wet road surface conditions can be improved.

According to the present invention, a pneumatic tire comprises a tread portion having tread edges and provided with a shoulder main groove and shoulder blind grooves, the shoulder blind grooves extending axially inwardly from one of the tread edges and each having an axially inner blind end, and the shoulder main groove extending continuously in the tire circumferential direction on the axially inside of said axially inner blind ends of the shoulder blind grooves, wherein the shoulder blind grooves are each provided with an axially inner shallow part, an axially outer deep part, and a sloped part therebetween having a depth gradually increasing from the shallow part towards the deep part, and having an axially outer end positioned at a distance we from the tire equator which is 42.5% to 45% of a tread width between the tread edges.

The pneumatic tire according to the present invention may be provided with the following features (1)-(5):
(1) a groove depth of the shallow part is 15% to 40% of a groove depth of the deep part;
(2) the tread portion is provided between the shoulder main groove and the tire equator with a center main groove extending continuously in the tire circumferential direction to define a middle land zone between the center main groove and the shoulder main groove, and the middle land zone is provided with middle slots extending axially inwardly from the shoulder main groove so that the middle slots respectively extend from circumferential positions which are respectively substantially same as circumferential positions of said axially inner blind ends of the shoulder blind grooves;
(3) the bottom of the sloped part of each shoulder blind groove comprises a curved part whose bottom is curved convexly toward the radially outside with a radius of curvature of 45 to 180 mm in a cross section of the groove taken along the longitudinal direction of the groove;
(4) the tread portion is provided with a tread pattern asymmetric about the tire equator, and said one of the tread edges from which the shoulder blind grooves extend is an inboard tread edge intended to be positioned towards the center of a vehicle body when the tire is installed thereon;
(5) the aspect ratio of the tire is not more than 45%.

Therefore, by the axially inner shallow parts of the shoulder blind grooves, the rigidity of the tread portion is well secured in the vicinity of the inner ends of the shoulder blind grooves, and the tire can be improved in the cornering performance in dry road surface conditions.

At the sane time, by the axially outer deep parts of the shoulder blind grooves, the drainage performance in wet road surface conditions and the external appearance of the tire can be maintained until a late stage of tread wear life.

Further, owing to the sloped part whose depth is gradually changed, a flow of water from the shallow part to the deep part becomes smooth, and the drainage performance in wet road surface conditions can be improved.

In addition, the distance between the tire equator and the axially outer ends of the sloped parts is optimized so that a change in the rigidity of the tread portion from the vicinity of the inner ends of the shoulder blind grooves to the tread edge becomes gradual, the cornering performance in dry road surface conditions can be further improved.

In this application including specification and claims, various dimensions, positions and the like of the tire refer to those under a normally inflated unloaded condition of the tire unless otherwise noted.

The normally inflated unloaded condition is such that the tire is mounted on a standard wheel rim and inflate to a standard pressure but loaded with no tire load.

The undermentioned normally inflated loaded condition is such that the tire is mounted on the standard wheel rim and inflated to the standard pressure and loaded with the standard ti re load.

The standard wheel rim is a wheel rim officially approved or recommended for the tire by standards organizations, i.e. JATMA (Japan and Asia), T&RA (North America), ETRTO (Europe), TRAA (Australia), STRO (Scandinavia), ALAPA (Latin America), ITTAC (India) and the like which are effective in the area where the tire is manufactured, sold or used.

The standard pressure and the standard tire load are the maximum air pressure and the maximum tire load for the tire specified by the same organization in the Air-pressure/Maximum-load Table or similar list.

For example, the standard wheel rim is the "standard rim" specified in JATMA, the "Measuring Rim" in ETRTO, the "Design Rim" in TRA or the like. The standard pressure is the "maximum air pressure" in JATMA, the "Inflation Pressure" in ETRTO, the maximum pressure given in the "Tire Load Limits at various Cold Inflation Pressures" table in TRA or the like. The standard load is the "maximum load capacity" in JATMA, the "Load Capacity" in ETRTO, the maximum value given in the above-mentioned table in TRA or the like. In case of passenger car tires, however, the standard pressure and standard tire load are uniformly defined by 180 kPa and 88% of the maximum tire load, respectively.

The tread edges To and Ti are the axial outermost edges of the ground contacting patch which occurs under the normally inflated loaded condition when the camber angle of the tire is zero.

The tread width TW is the width measured under the normally inflated unloaded condition, as the axial distance between the tread edges Te determined as above.

DESCRIPTION OF THE PREFERRED EMBODIMENTS

Figure 1:
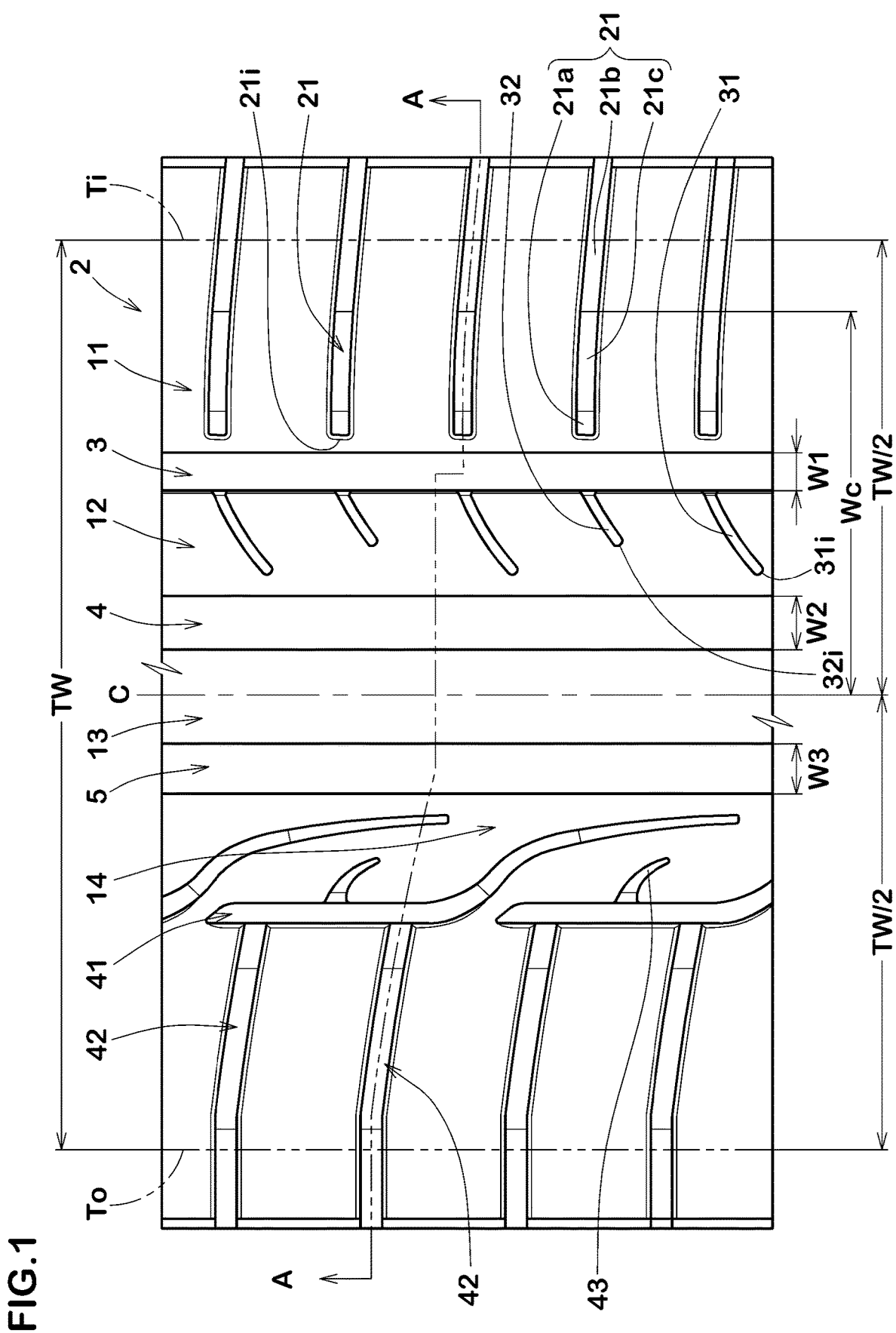
FIG. 1 is a developed partial plan view of a pneumatic tire as an embodiment of the present invention showing an example of the tread pattern.

The present invention is suitably applied to pneumatic tires for passenger cars.

Taking a radial tire for passenger cars as an example, an embodiment of the present invention will now be described in detail in conjunction with the accompanying drawings.

As well known in the art, the pneumatic tire comprises a tread portion 2, a pair of axially spaced bead portions each with a bead core therein, a pair of sidewall portions extending between the tread edges and the bead portions, a carcass extending between the bead portions, a tread reinforcing belt disposed radially outside the carcass in the tread portion In this embodiment, the pneumatic tire is provided in the tread portion 2 with a tread pattern of left-right asymmetry (asymmetry about the tire equator) defined by tread grooves.

Accordingly, the mounting position of the tire in relation to a vehicle (which side is inside and which side is outside) is specified.

Thus, the tread portion 2 has an outboard tread edge To to be positioned away from the center of the vehicle body and an inboard tread edge Ti to be positioned close to the center of the vehicle body.

For example, the sidewall portion to be located on the outside when installed on the vehicle is provided with an indication such as "outside", and the sidewall portion to be located on the inside is provided with an indication such as "inside". According thereto, in this application, the terms "outboard" and "inboard" are used toward the outboard tread edge To and inboard tread edge Ti, respectively, to refer relative positions in the tire axial direction.

The terms "axially inner", "axially inward" and the like are used toward the tire equator, and the terms "axially outer", "axially outward" and the like are used toward the adjacent tread edge in order to refer relative positions in the tire axial direction.

The tread portion 2 is provided with circumferentially continuously extending main grooves.

In this embodiment, the main grooves include an inboard shoulder main groove 3, an inboard crown main groove 4 and an outboard crown groove 5.

The inboard shoulder main groove 3 is disposed on the inboard tread edge Ti side of the tire equator C, and is closest to the inboard tread edge Ti in the main grooves.

The inboard shoulder main groove 3 may be formed as a zigzag groove or wavy groove. But, in this example, the inboard shoulder main groove 3 is a straight groove in order to increase the circumferential rigidity of an outboard land zone and thereby improve the straight running stability.

The inboard crown main groove 4 is disposed between the inboard shoulder main groove 3 and the tire equator C.

The inboard crown main groove 4 may be formed as a zigzag groove or wavy groove. But, in this example, the inboard crown main groove 4 is a straight groove in order to increase the circumferential rigidity of an outboard land zone and thereby improve the straight running stability.

The outboard crown groove 5 is disposed on the outboard tread edge To side of the tire equator c, and is closest to the outboard tread edge To in the main grooves.

The outboard crown groove 5 may be formed as a zigzag groove or wavy groove. But, in this example, the outboard crown groove 5 is a straight groove in order to increase the circumferential rigidity of an inboard land zone and thereby improve the straight running stability.

The widths W1-W3 of the main grooves 3-5 may be set arbitrarily, but preferably, the widths W1-W3 are set in a range of from 3.0% to 8.0% of the tread width TW.

In this embodiment, the width W2 of the inboard crown main groove 4 is set to be more than the width W1 of the inboard shoulder main groove 3 in order to increase the drainage in the tread crown portion.

In the case of a passenger tire as in this embodiment, the depths D1-D3 of the main grooves 3-5 are preferably set in a range of from 5 to 10 mm for example, By the main grooves 3-5, the tread portion 2 is divided into an inboard shoulder land zone 11, an inboard middle land zone 12, a central land zone 13, and an outboard shoulder land zone 14.

The inboard shoulder land zone 11 is defined between the inboard shoulder main groove 3 and the inboard tread edge Ti.

The inboard shoulder land zone 11 is provided with a plurality of inboard shoulder blind grooves 21 extending axially inwardly from the inboard tread edge Ti.

Each of the inboard shoulder blind grooves 21 terminates without being connected to the inboard shoulder main groove 3 and has an axially inner blind end 21i.

The inboard middle land zone 12 is defined between the inboard shoulder main groove 3 and the inboard crown main groove 4.

The inboard middle land zone 12 is provided with a plurality of middle slots 31 and 32 extending axially inwardly from the inboard shoulder main groove 3, and terminating without being connected to the inboard crown main groove 4.

The middle slots in this embodiment include first middle slots 31 and second middle slots 32 having an axial length shorter than that of the first middle slots 31.

The first middle slots 31 and the second middle slots 32 are alternately arranged in the tire circumferential direction.

Figure 3:
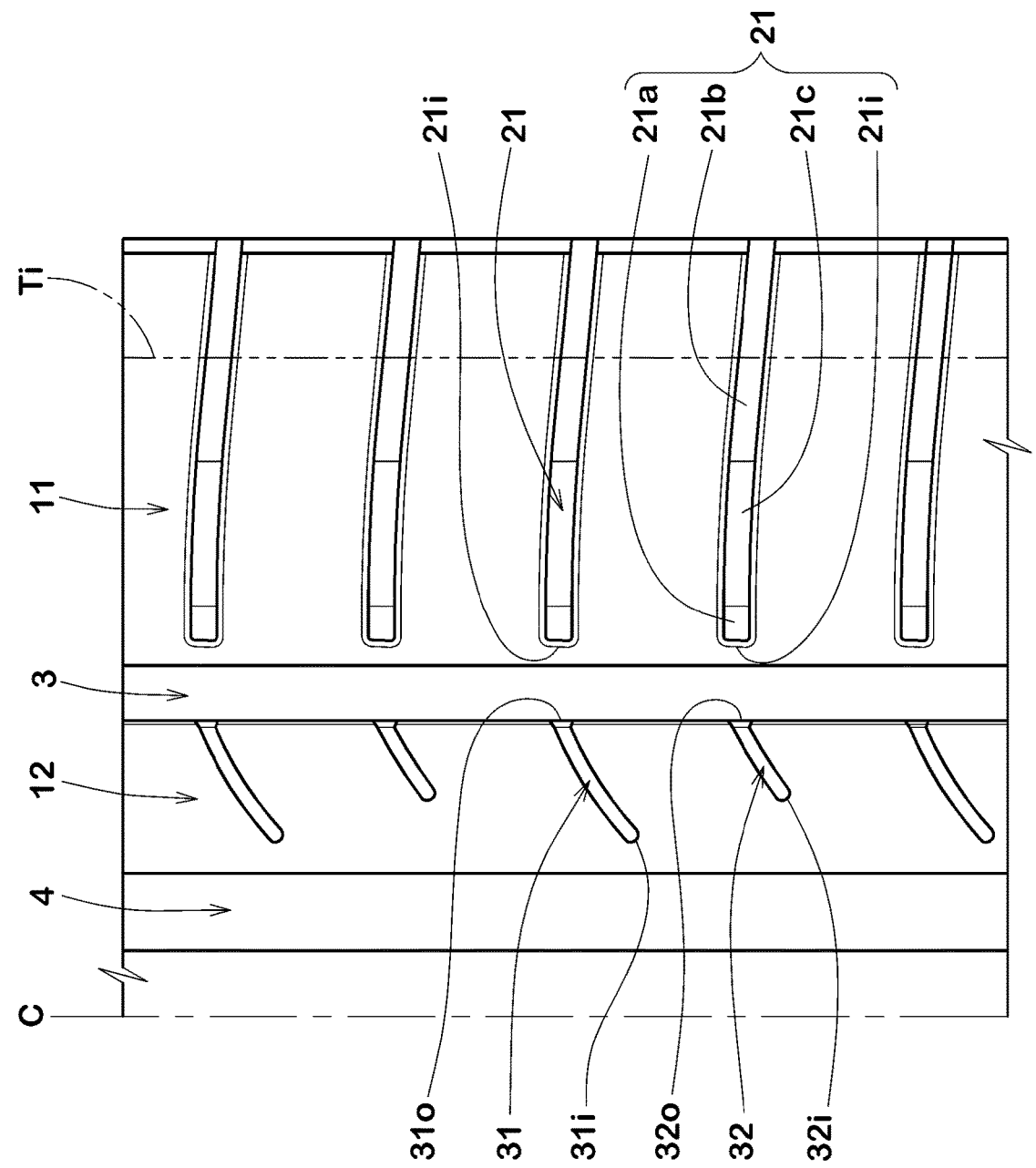
FIG. 3 is a closeup of the tread portion in FIG. 1 showing an inboard shoulder land zone and an inboard middle land zone.
Figure 4:
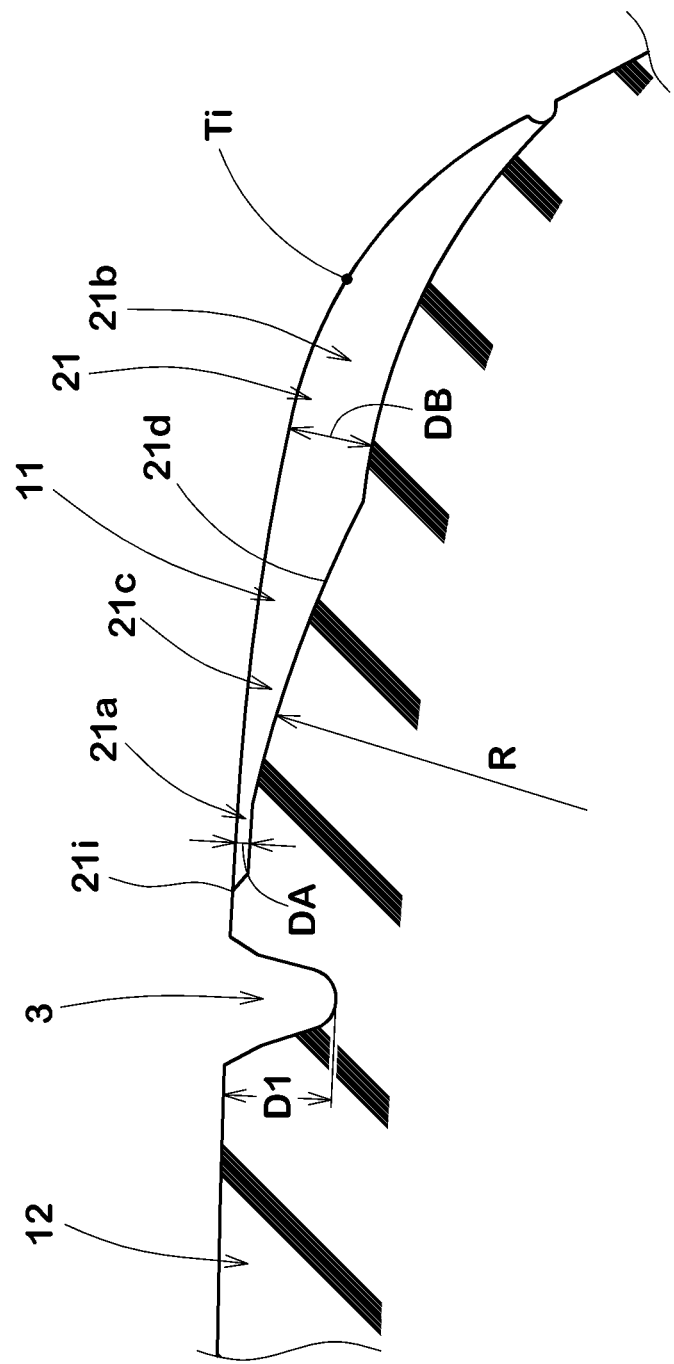
FIG. 4 is a cross sectional view of the inboard shoulder land zone in FIG. 2.

As shown in FIG. 3 and FIG. 4, the inboard shoulder blind groove 21 is provided with an axially inner shallow part 21a, an axially outer deep part 21b, and an in-between sloped part 21c.

The depth DB of the deep part 21b is more than the depth DA of the shallow part 21a.

The sloped part 21c has an axially inner end connected to the shallow part 21a, and an axially outer end connected to the deep part 21b.

The depth of the sloped part 21c is gradually increased from the shallow part 21a toward the deep part 21b.

In this embodiment, the shallow part 21a extends from the axially inner blind end 21i of the inboard shoulder blind groove 21 so that the rigidity of the tread portion 2 is well secured in the vicinity of the axially inner blind ends 21i of the inboard shoulder blind grooves 21, and thereby the cornering performance in dry road surface conditions can be improved.

The deep part 21b extends to the inboard tread edge Ti so that the drainage performance in wet road surface conditions and the external appearance of the tire are maintained until a late stage of tread wear life.

The sloped part 21c extends between the shallow part 21a and the deep part 21b, therefore the flow of water from the shallow part 21a to the deep part 21b becomes smooth, and the drainage performance in wet road surface conditions can be improved.

Figure 2:
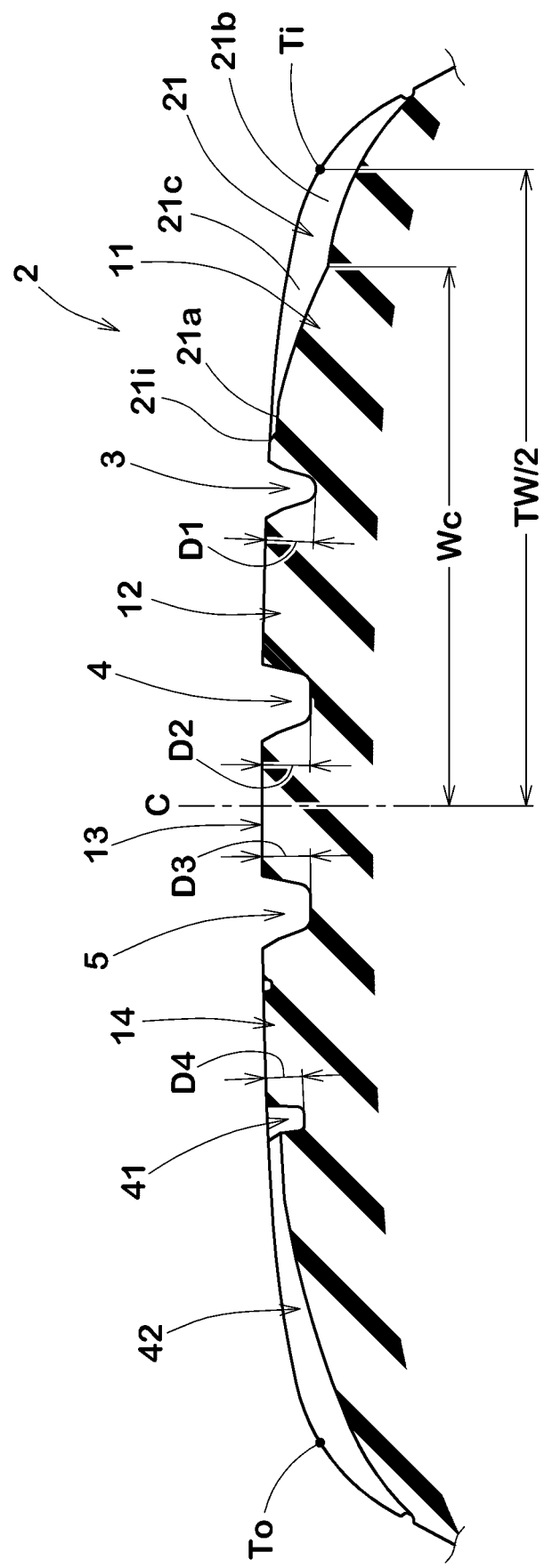
FIG. 2 is a cross sectional view of the tread portion thereof taken line A-A in FIG. 1.

As shown in FIG. 1 and FIG. 2, the axial distance Wc from the tire equator C to the axially outer end of each sloped part 21c is set in a range of from 0.85 to 0.90 times one half TW/2 of the tread width TW.

As a result, the change in the rigidity of the tread portion 2 from the vicinity of the axially inner blind ends 21i of the inboard shoulder blind grooves 21 to the inboard tread edge Ti becomes gradual, and the cornering performance in dry road surface conditions can be further improved.

Further, in the neighborhood of the inboard tread edge Ti, the deep parts 21b maintain a substantial length even in a middle stage and late stage of tread wear life, therefore, the drainage performance in wet road surface conditions and the external appearance of the tire are maintained.

If the distance Wc is less than 0.85 times the half tread width TW/2, there is a possibility that the change in the rigidity of the tread portion 2 from the vicinity of the axially inner blind ends 21i of the inboard shoulder blind grooves 21 to the inboard tread edge Ti becomes abrupt, which impinges against the cornering performance in dry road surface conditions.

If the distance Wc is more than 0.90 times the half tread width TW/2, there is a possibility that the length of the deep part 21b becomes insufficient in a middle stage and late stage of tread wear life, impinging against the drainage performance in wet road surface conditions and the external appearance of the tire.

As shown in FIG. 4, the ratio DA/DB of the groove depth DA of the shallow part 21a and the groove depth DB of the deep part 21b is preferably set in a range of from 0.15 to 0.40.

If the ratio DA/DB is less than 0.15, the rigidity of the inboard shoulder land zone 11 is decreased in the vicinity of the axially inner blind ends 21i of the inboard shoulder blind grooves 21, which has a possibility of impinging against the cornering performance in dry road surface conditions and the drainage in the vicinity of the inboard tread edge Ti.

If the ratio DA/DB is more than 0.40, the rigidity of the inboard shoulder land zone 11 is decreased near the inboard tread edge Ti, which has a possibility of impinging against the cornering performance in dry road surface conditions as well as a possibility of impinging against the drainage in the vicinity of the axially inner blind ends 21i of the inboard shoulder blind grooves 21.

As shown in FIG. 3, the above-mentioned first and second middle slots 31 and 32 are inclined with respect to the tire axial direction.

The first and second middle slots 31 and 32 are slightly curved.

The first and second middle slots 31 and 32 are aligned with the inboard shoulder blind grooves 21 through the inboard shoulder main groove 3. More specifically, the axially outer ends 31o and 32o of the first and second middle slots 31 and 32 are placed at circumferential positions which are respectively substantially same as the circumferential positions of the axially inner blind ends 21i of the inboard shoulder blind grooves 21. Thereby, the drainage from the inboard middle land zone 12 to the inboard shoulder land zone 11 is facilitated, and the wet performance is improved.

As shown in FIG. 4, the sloped part 21c of the inboard shoulder blind groove 21 includes a curved part 21d whose groove bottom is, in a cross section of the groove taken along the longitudinal direction thereof, curved convexly toward the radially outside, and has a radius of curvature R preferably in a range of from 45 to 180 mm.

If the radius of curvature R is less than 45 mm, there is a possibility that the depth of the sloped part 21c becomes insufficient near the shallow part 21a, impinging against the drainage.

If the radius of curvature R is more than 180 mm, the rigidity of the inboard shoulder land zone 11 is decreased, which has a possibility of impinging against the cornering performance in dry road surface conditions.

The above-mentioned outboard shoulder land zone 14 is defined between the outboard crown groove 5 and the outboard tread edge To.

As shown in FIG. 1, the outboard shoulder land zone 14 is provided with a plurality of outboard shoulder sub grooves 41 essentially extending in the tire circumferential direction, a plurality of outboard shoulder grooves 42 extending axially inwardly from the outboard tread edge To to the outboard shoulder sub grooves 41, and a plurality of outboard shoulder slots 43 extending axially inwardly from the outboard shoulder sub grooves 41.

The outboard shoulder sub grooves 41 have a depth D4 less than the depths D1-D3 of the main grooves 3-5.

Figure 5:
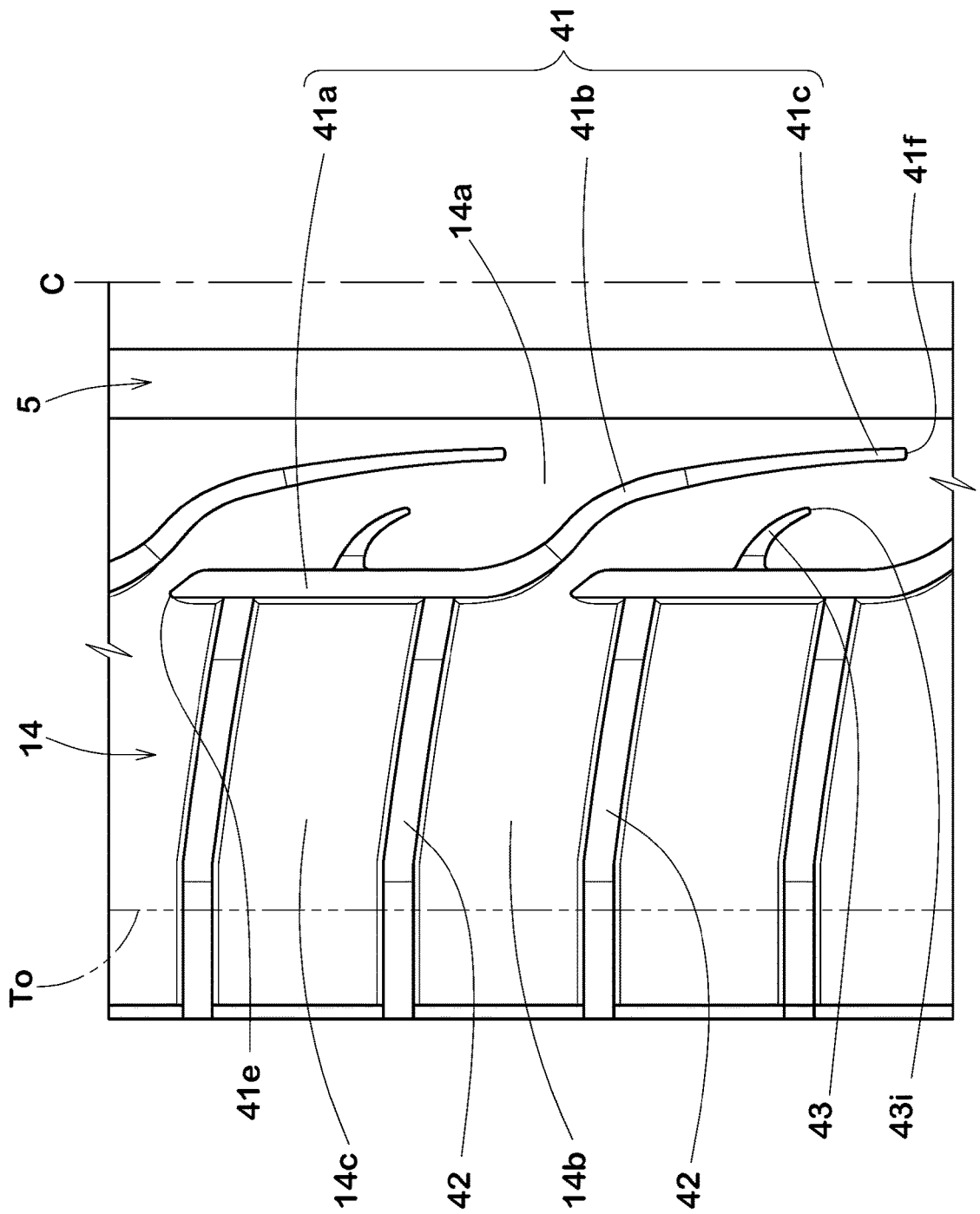
FIG. 5 is a closeup of the tread portion in FIG. 1 showing an outboard shoulder land zone.

As shown in FIG. 5, each of the outboard shoulder sub grooves 41 comprises a circumferential part 41a, a curved part 41b, and an inclined part 41c.

The circumferential part 41a extends substantially parallel with the tire circumferential direction.

The circumferential parts 41a of the outboard shoulder sub grooves 41 are arranged in line.

The curved part 41b extends from the circumferential part 41a, while curving toward the axially inside, and than curving toward one circumferential direction. Thus, the curved part 41b has a s-shaped configuration.

The inclined part 41c extends from the curved part 41b, while inclining with respect to the tire circumferential direction at a small angle.

The curved part 41b and the inclined part 41c of each outboard shoulder sub groove 41 are overlapped, in the tire circumferential direction, with the circumferential part 41a of a next outboard shoulder sub groove 41.

Each outboard shoulder sub groove 41 has a first blind end 41e in the circumferential part 41a and a second blind end 41f in the inclined part 41c.

A first land zone 14a on the axially inside of the circumferential parts 41a is connected with a second land zone 14b on the axially outside of the circumferential parts 41a through between the circumferential parts 41a, therefore, the outboard shoulder land zone 14 is provided with high rigidity, which helps to improve the cornering performance in dry road surface conditions.

At the same time, the outboard shoulder sub grooves 41 having the above-mentioned configuration enhance the drainage in the outboard shoulder land zone 14, and the wet performance of the pneumatic tire is improved.

To the circumferential part 41a of each outboard shoulder sub groove 41, two of the outboard shoulder grooves 42 are connected. As a result, by the circumferential part 41a and two outboard shoulder grooves 42, a third land zone 14c as an independent block is defined per one outboard shoulder sub groove 41.

The depth of each of the outboard shoulder grooves 42 is gradually increased toward the outboard tread edge To from the outboard shoulder sub groove 41.

The circumferential part 41a of each of the outboard shoulder sub grooves 41 is connected by one outboard shoulder slot 43.

The outboard shoulder slot 43 extends axially inwardly and terminates without being connected to the inclined part 41c of a next outboard shoulder sub groove 41 so as to have an axially inner blind end 43i.

As shown in FIG. 1, the above-mentioned central land zone 13 between the inboard crown main groove 4 and the outboard crown groove 5 is not provided with any void of tread rubber such as groove and sipe in order that the central land zone 13 has high rigidity and thereby the steering stability in dry road surface conditions is improved.

From a point of view of the cornering performance, it is preferable that the aspect ratio of the pneumatic tire having the above-described construction is set in a range of not more than 45% in order to effectively improve the drainage performance.

While description has been made of one particularly preferable embodiment of the present invention, the illustrated embodiment should not be construed as to limit the scope of the present invention; various modifications are possible without departing from the scope of the present invention.

Comparison Tests

Based on the tread pattern shown in FIG. 1, pneumatic tires of size 245/40R18 (rim side 18λ8.5 J) having specifications shown in Table 1 were manufactured and tested for the cornering performance and drainage performance.

<Cornering Performance Test>

Using a flat belt type testing machine, each test tire inflated to 230 kPa and loaded with 6.86 kN was measured for the cornering force and the maximum value thereof was obtained. The results are indicate in Table 1 by an index based on Embodiment 1 being 100, wherein the large the value, the better the cornering performance.

<Drainage Test>

Running a test car provided with test tires on a wet road surface covered with about 1.4 mm deep water and having a frictional coefficient of 0.3, the cornering ability was evaluated by the test driver.

The results are indicate in Table 1 by an index based on Embodiment 1 being 100, wherein the large the value, the better the drainage performance.

TABLE 1

| Tire | sloped part | Dc/0.5TW | DA/DB | cornering performance | drainage performance |
|---|---|---|---|---|---|
| embodiment 1 | present | 0.90 | 0.20 | 100 | 100 |
| embodiment 2 | present | 0.85 | 0.20 | 100 | 100 |
| embodiment 3 | present | 0.90 | 0.15 | 102 | 98 |
| embodiment 4 | present | 0.90 | 0.40 | 96 | 101 |
| embodiment 5 | present | 0.90 | 0.10 | 102 | 97 |
| embodiment 6 | present | 0.90 | 0.50 | 94 | 101 |
| comparative example 1 | absent | — | 1.00 | 87 | 102 |
| comparative example 2 | present | 0.80 | 0.20 | 90 | 101 |
| comparative example 3 | present | 1.00 | 0.20 | 101 | 95 |

It was confirmed from the tests that the tires according to the present invention can be improved in the cornering performance and drainage performance in a well balanced manner.

REFERENCE SIGNS LIST 2 tread portion
3 inboard shoulder main groove
4 inboard crown main groove
21 inboard shoulder blind groove
21a shallow part
21b deep part
21c sloped part
21d curved part
21i axially inner blind end
31 first middle slot
32 second middle slot
Ti inboard tread edge

The invention claimed is:
1. A pneumatic tire comprising:
a tread portion having tread edges and provided with an asymmetrical tread pattern about a tire equator,
wherein the tread pattern comprises grooves extending continuously in a tire circumferential direction which are a shoulder main groove, a first center main groove, and a second center main groove,
wherein the first center main groove is disposed on one side of the tire equator, the shoulder main groove is disposed on axially outside of the first center main groove, and the second center main groove is disposed on the other side of the tire equator,
wherein the tread pattern further comprises shoulder blind grooves disposed on said one side of the tire equator and extending axially inwardly from an adjacent tread edge and each terminating without being connected to the shoulder main groove to have an axially inner blind end,
wherein the shoulder blind grooves are each provided with:
an axially inner shallow part defined as having a constant depth,
an axially outer deep part, and
a sloped part therebetween defined as having a depth gradually increasing from the inner shallow part towards the outer deep part, and having an axially outer end positioned at a distance Wc from the tire equator which is 42.5% to 45% of a tread width between the tread edges, and wherein
the tread pattern further comprises shoulder sub grooves separating from each other and each extending in the tire circumferential direction on the axially outside of the second center main groove,
the shoulder sub grooves each comprise a circumferential part parallel to the tire circumferential direction, and an inclined part that is inclined with respect to the tire circumferential direction, the circumferential part and the inclined part being joined to one another by a curved part extending from the circumferential part while curving toward the axially inside of the tire and then curving toward the tire circumferential direction, and
the shoulder sub grooves are arranged in the tire circumferential direction so that the curved part and the inclined part of each shoulder sub groove overlap with the circumferential part of one of the circumferentially adjacent shoulder sub grooves in the tire circumferential direction.

2. The pneumatic tire according to claim 1, wherein the depth of the deep part is in a range from 1/0.15 to 1/0.40 times the depth of the shallow part.

3. The pneumatic tire according to claim 1, wherein a middle land zone between the first center main groove and the shoulder main groove is provided with middle slots extending axially inwardly from the shoulder main groove so that the middle slots respectively extend from circumferential positions which are respectively substantially same as circumferential positions of said axially inner blind ends of the shoulder blind grooves.

4. The pneumatic tire according to claim 1, wherein the bottom of the sloped part of each shoulder blind groove comprises a curved part whose bottom is curved convexly toward the radially outside with a radius of curvature of 45 to 180 mm in a cross section of the groove taken along the longitudinal direction of the groove.

5. The pneumatic tire according to claim 1, wherein said one of the tread edges from which the shoulder blind grooves extend is an inboard tread edge intended to be positioned towards the center of a vehicle body when the tire is installed thereon.

6. The pneumatic tire according to claim 1, wherein the aspect ratio of the tire is not more than 45%.

7. The pneumatic tire according to claim 2, wherein a middle land zone between the first center main groove and the shoulder main groove is provided with middle slots extending axially inwardly from the shoulder main groove so that the middle slots respectively extend from circumferential positions which are respectively substantially same as circumferential positions of said axially inner blind ends of the shoulder blind grooves.

8. The pneumatic tire according to claim 2, wherein the bottom of the sloped part of each shoulder blind groove comprises a curved part whose bottom is curved convexly toward the radially outside with a radius of curvature of 45 to 180 mm in a cross section of the groove taken along the longitudinal direction of the groove.

9. The pneumatic tire according to claim 3, wherein the bottom of the sloped part of each shoulder blind groove comprises a curved part whose bottom is curved convexly toward the radially outside with a radius of curvature of 45 to 180 mm in a cross section of the groove taken along the longitudinal direction of the groove.

10. The pneumatic tire according to claim 2, wherein said one of the tread edges from which the shoulder blind grooves extend is an inboard tread edge intended to be positioned towards the center of a vehicle body when the tire is installed thereon.

11. The pneumatic tire according to claim 3, wherein said one of the tread edges from which the shoulder blind grooves extend is an inboard tread edge intended to be positioned towards the center of a vehicle body when the tire is installed thereon.

12. The pneumatic tire according to claim 4, wherein said one of the tread edges from which the shoulder blind grooves extend is an inboard tread edge intended to be positioned towards the center of a vehicle body when the tire is installed thereon.

13. The pneumatic tire according to claim 2, wherein the aspect ratio of the tire is not more than 45%.

14. The pneumatic tire according to claim 3, wherein the aspect ratio of the tire is not more than 45%.

15. The pneumatic tire according to claim 4, wherein the aspect ratio of the tire is not more than 45%.

16. The pneumatic tire according to claim 5, wherein the aspect ratio of the tire is not more than 45%.

17. The pneumatic tire according to claim 1, wherein the tread pattern further comprises, on the axially outside of the shoulder sub grooves extending in the tire circumferential direction, shoulder grooves extending axially inwardly from the tread edge to the shoulder sub grooves.

18. The pneumatic tire according to claim 17, wherein the shoulder grooves have a depth gradually increased toward the adjacent tread edge from the shoulder sub grooves.

19. The pneumatic tire according to claim 1, wherein the circumferential part of each of the shoulder sub grooves is connected by a shoulder slot which extends axially inwardly and terminates without being connected to the inclined part of the next overlapped shoulder sub groove so as to have an axially inner blind end.

20. The pneumatic tire according to claim 1, wherein a central land zone defined between the first center main groove and the second center main groove is provided with none of the grooves, slots and sipes.

21. The pneumatic tire according to claim 1, wherein
a middle land zone defined between the shoulder main groove and the first center main groove is provided with first middle slots and second middle slots extending axially inwardly from the shoulder main groove,
the first middle slots have an axial length and the second middle slots have an axial length shorter than that of the first middle slots, and
the first middle slots and the second middle slots are alternately arranged in the tire circumferential direction.

22. The pneumatic tire according to claim 1, wherein the shoulder main groove, the first center main groove and the second center main groove have widths of from 3.0% to 8.0% of the tread width.

23. The pneumatic tire according to claim 1, wherein the shoulder main groove, the first center main groove and the second center main groove have depths of from 5 to 10 mm.

* * * * *